UNITED STATES PATENT OFFICE.

JOHANN JAKOB BRACK, OF BASLE, SWITZERLAND, ASSIGNOR TO L. DURAND, HUGUENIN & CO., OF ST. FONS, FRANCE, BASLE, SWITZERLAND, AND HÜNINGEN, GERMANY.

DIAMIDO BASE.

SPECIFICATION forming part of Letters Patent No. 516,755, dated March 20, 1894.

Application filed December 15, 1893. Serial No. 493,760. (Specimens.) Patented in France April 6, 1892, No. 220,724; in Germany April 15, 1893, No. 72,431, and in England June 28, 1893, No. 12,704.

*To all whom it may concern:*

Be it known that I, JOHANN JAKOB BRACK, a citizen of the Swiss Republic, residing at Basle, Switzerland, have invented new and useful Improvements in the Production of New Diamido Bases, (partly patented by the firm L. Durand, Huguenin & Co., of St. Fons, near Lyons, France, Basle, Switzerland, and Hüningen, Germany, in France by Letters Patent of addition, dated April 13, 1893, to Patent No. 220,724, dated April 6, 1892; in England by Letters Patent No. 12,704, dated June 28, 1893, and in Germany by Letters Patent No. 72,431, dated April 15, 1893;) and I do hereby declare the following to be a full, clear, and exact description of the invention, such as will enable others skilled in the art to which it appertains to make and use the same.

This invention relates to the production of new unsymmetrical diamido-bases applicable to the manufacture of coloring matters dyeing unmordanted cotton in an alkaline bath, by the condensation of one molecule of formaldehyde with one molecule dianisidin and one molecule of the hydrochlorate of an aromatic monoamido-compound, such, for instance, as orthoamidophenol or anilin.

By way of example, I shall describe hereinafter the method of producing certain of these new diamido-bases.

I. *Production of the unsymmetric diamido-base derived from formaldehyde, dianisidin and hydrochlorate of anilin.*—24.4 kilos of dianisidin and thirteen kilos of anilin hydrochlorate are triturated with ten kilos of alcohol to the consistency of a thick paste and then mixed with 7.5 kilos of a forty per cent. solution of formaldehyde. After standing for a short time, the mass is heated preferably on the water bath for one or two days, during which time the greater part of the anilin and dianisidin employed is applied to form the new base. In order to eliminate the matters that do not form part of the reaction product, the melt is treated with diluted sulfuric acid, whereby the new base is dissolved while the dianisidin and anilin sulfates that do not readily dissolve are separated by filtration. From the sulfate solution the new body is precipitated by the addition of alkali as a resinous mass. The diamido-base thus prepared fuses at 75° to 80° centigrade; is only partially soluble in hot alcohol, more readily in hot benzene, and almost insoluble in ether. Its hydrochlorate and sulfate are readily soluble in water. It has apparently the formula:

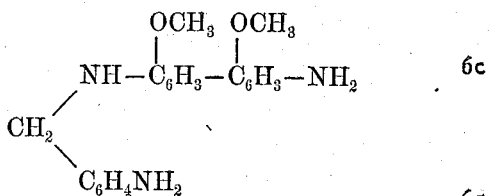

Its tetrazo-compound which is soluble in water forms for example, with alpha-naphtol-alpha-sulfonic acid a blue dye for cotton.

II. *Production of the unsymmetrical diamido-base derived from formaldehyde, dianisidin and orthoamidophenol.*—If in the above example, 14.5 kilos of hydrochlorate of orthoamidophenol is substituted for the thirteen kilos hydrochlorate of anilin, there is obtained a diamido-base having the formula:

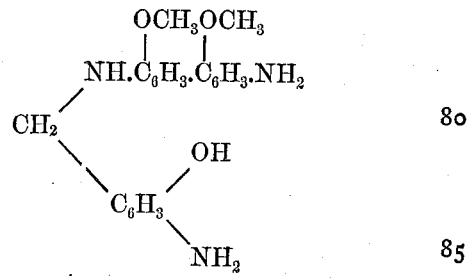

This base forms a dark brown resinous mass, scarcely soluble in alcohol, insoluble in ether and benzene. Its hydrochlorate and sulfate are soluble in water. Its tetrazo-derivative forms with alpha-naphtol-alpha-sulfonic acid, a blue coloring matter, which dyes cotton without a mordant.

What I claim as my invention, and wish to secure by Letters Patent, is—

1. The herein described process for the production of a diamido-base applicable to the manufacture of substantive cotton dyes, by the reaction under heat of one molecule of formaldehyde on a mixture of one molecule of dianisidin and one molecule of the chlorhydrate of an aromatic monoamido-compound, as set forth.

2. The herein described process for the production of a diamido-base applicable to the manufacture of substantive cotton dyes, by the reaction under heat of one molecule of formaldehyde on a mixture of one molecule of dianisidin and one molecule of hydrochlorate of anilin, as set forth.

3. The herein described diamido-base applicable to the manufacture of substantive cotton dyes derived from formaldehyde, dianisidin and hydrochlorate of anilin, which constitutes a resinous mass, fuses at 75° to 80° centigrade, is only partially soluble in hot alcohol, more readily in hot benzene, and almost insoluble in ether, and forms salts and a tetrazo-derivative soluble in water, as set forth.

In witness whereof I have hereunto signed my name in the presence of two subscribing witnesses.

JOHANN JAKOB BRACK.

Witnesses:
   THEODORE STACHELIN,
   GEORGE GIFFORD.